J. MAYER.
VEHICLE SIGNAL.
APPLICATION FILED JULY 28, 1917.

1,407,471.

Patented Feb. 21, 1922.
2 SHEETS—SHEET 1.

WITNESSES:
B. Hall
Q. E. Sorensen

INVENTOR:
JOHN MAYER.
BY Paul & Paul
ATTORNEYS.

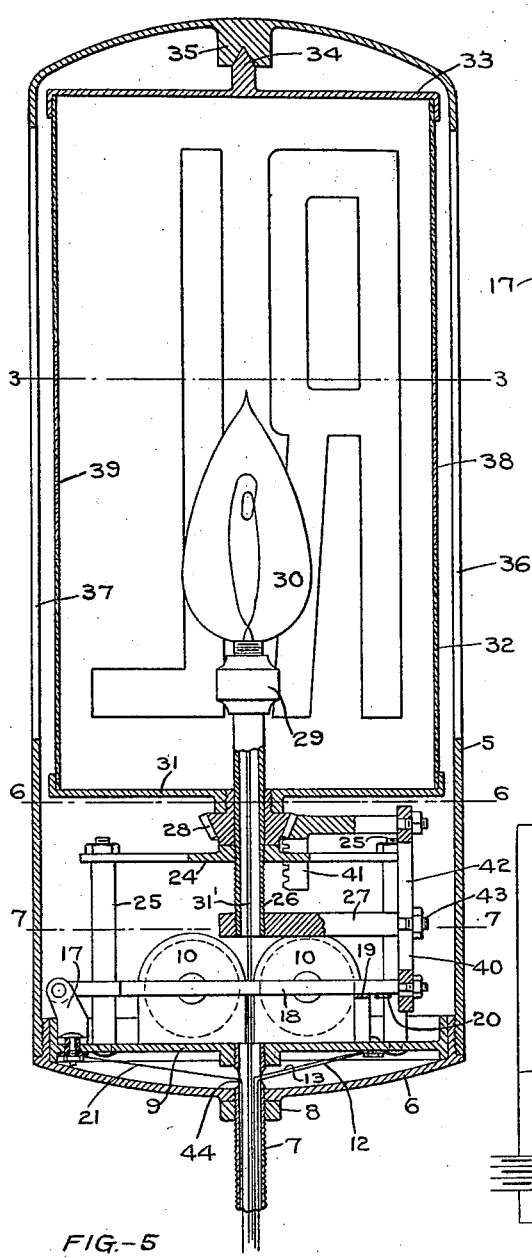
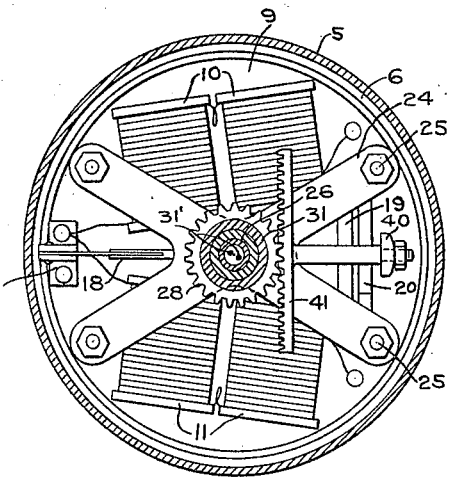
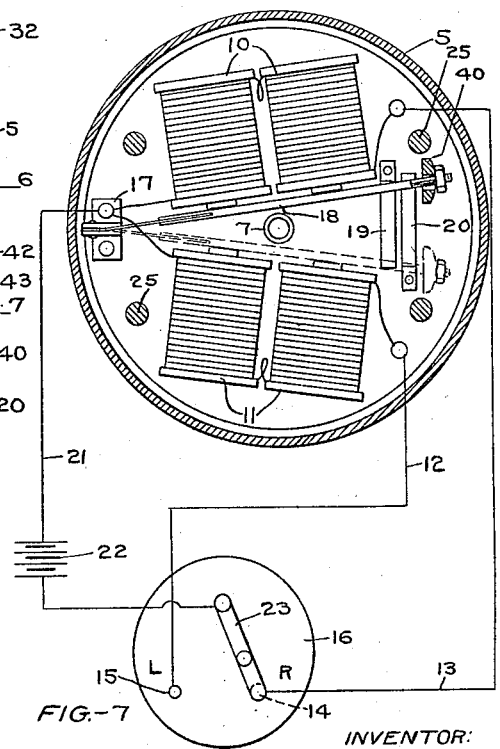

UNITED STATES PATENT OFFICE.

JOHN MAYER, OF MINNEAPOLIS, MINNESOTA.

VEHICLE SIGNAL.

1,407,471. Specification of Letters Patent. Patented Feb. 21, 1922.

Application filed July 28, 1917. Serial No. 183,282.

*To all whom it may concern:*

Be it known that I, JOHN MAYER, a citizen of the United States, resident of Minneapolis, county of Hennepin, State of Minnesota, have invented certain new and useful Improvements in Vehicle Signals, of which the following is a specification.

My invention relates to a vehicle signaling device by means of which the driver can indicate to any one in the front or in the rear of the vehicle in which direction he intends to turn, and thereby avoid injury to pedestrians and damage to other vehicles and the occupants thereof.

A further object is to provide a signal which can be easily mounted on a car or other vehicle and be plainly visible from the front and the rear.

Other objects of the invention will appear from the following detailed description.

The invention consists generally in various constructions and combinations, all as hereinafter described and particularly pointed out in the claims.

Figure 1:
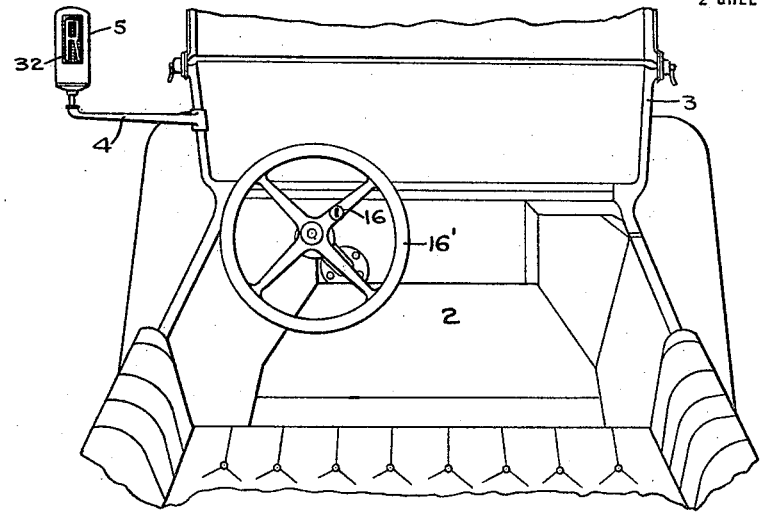
Figure 2:
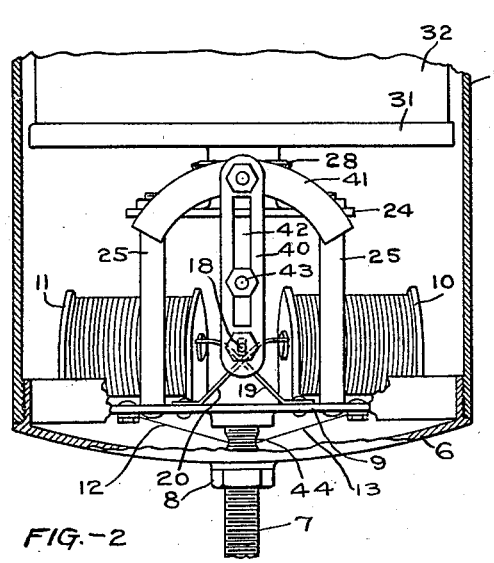
Figure 3:
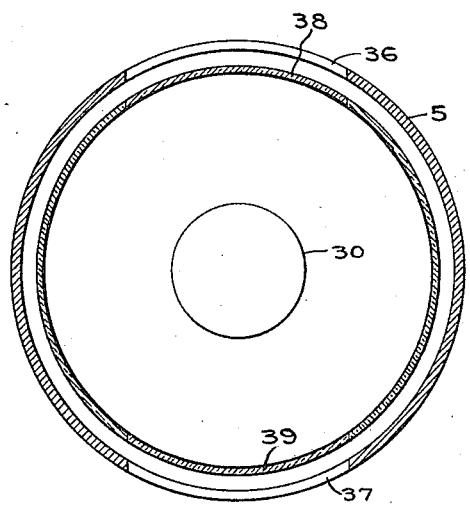
Figure 4:
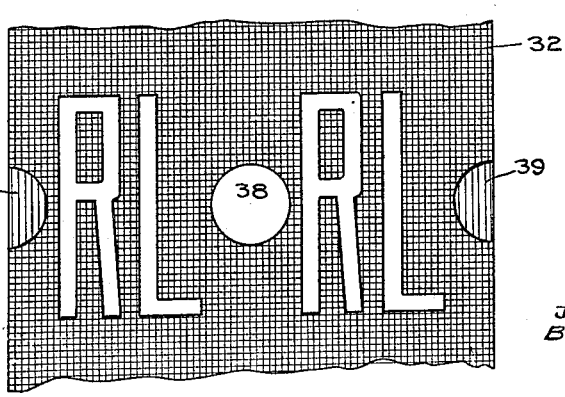

In the accompanying drawings forming part of this specification,

Figure 1 shows a front end of an automobile, with my signaling apparatus attached thereto, Figure 2 is a detail sectional view, Figure 3 is a cross sectional view, taken on the line 3—3 of Figure 5, Figure 4 is a view of the inner cylinder laid open, Figure 5 is a vertical sectional view of the device, Figure 6 is a cross sectional view taken on the line 6—6 of Figure 5, Figure 7 is a similar view taken on the line 7—7 of Figure 5.

In the drawing, 2 represents the front portion of an automobile, provided with the wind shield 3. On the frame of the wind shield I mount a bracket 4, on which is supported the signaling device. This device consists of a cylinder 5 mounted on a base 6 and having a sleeve 7 threaded into said base and secured by means of a lock nut 8. At the upper end of said sleeve I provide a plate 9 fitting snugly within the base 6 and securely held therein by being drawn down by the sleeve 7 and locked by the nut 8. Upon this plate 9 I mount two sets of magnets 10 and 11, connected with suitable conductors 12 and 13 to posts 14 and 15 of a switch-board 16 that is mounted on the steering wheel 16' within the reach of the operator, as shown in Figure 1. On this base I also provide an arm 17 to which is pivoted the armature 18. Said armature is normally held in its neutral position between the two sets of magnets by means of springs 19 and 20 (see Figures 2 and 7). The magnets 10 and 11 have a conductor 21 connected to a battery 22 and thence to the lever 23 on a switch 16. This will provide a circuit for the armature to be moved to contact with either set of magnets, as desired.

Directly above these magnets I provide a bearing 24 having suitable connections 25 with the plate 9 and in this bearing 24 I secure a sleeve 26, the lower end of which has secured to it an arm 27 while the upper end projects through a pinion 28 and has a socket connection 29 with an electric globe 30. The pinion 28 has secured to it a plate 31 on which is mounted a cylinder 32 encased at its upper end in a plate 33 that has bearings 34 in a lug 35 at the upper end of the cylinder 5. Whenever the pinion 28 is revolved, the cylinder 32 will revolve therewith and different parts of said cylinder will be exposed through openings 36 and 37 in the cylinder 5. These openings are located to face the front and the rear of the machine and whenever the driver wishes to turn the vehicle, the proper character as R or L, will be exposed in both of these openings. The cylinder 32 is all black, with the exception of where the characters are shown (see Figure 4). I have here shown the letters R—R and the letters L—L and I also show a circle 38 in white and a circle 39 in red. These circles will be opposite each other and the circle 38 will show white in front of the machine, while the circle 39 will show red in the rear. When the armatures are neutral, these two circles will be exposed to the openings 36 and 37, but if the operator wishes to turn to the right, he will throw the switch 39 on the contact point 14 and a circuit will be formed through the conductor 13, magnets 10 and the conductor 21 and through the battery and cause the cylinder 32 to revolve and expose the letters R—R, one through each of the openings 36 and 37. The armature will remain in this position as long as the operator keeps this circuit closed. As soon as released, the parts will return to their normal position and show the white and the red signals, The globe 30 has conductors 31 connected to suitable batteries or other source of electrical energy, not shown.

If the driver wishes to turn to the left, the circuit will be closed through the lever 23, contact point 15, conductors 12, magnets 11, conductors 21 and battery 22 and the armature 18 will be drawn over from its neutral position to the magnets 11 and the letters L—L will be exposed through the openings 26 and 37, indicating that the driver wishes to turn to the left.

To revolve the spindle 32, I provide a link 40 loosely mounted on the end of the armature 18. The upper end of this link has secured to it a quadrant 41 which engages the teeth of the pinion 28. This link 40 has a slot 42 and within said slot the pin 43 on the arm 27 serves as a pivot for this link. It will be seen that whenever the armature 18 is moved from one set of magnets to the other, the lower end of the link 40 will be moved and by means of the pin 43 the upper end of the link will move in the opposite direction and this movement will, through the quadrant 41 and pinion 28, revolve the cylinder 32 in either direction. The springs 19 and 20, as shown in Figure 2, are of such construction that they will return and hold the armature 18 in its neutral position. The arm 27 may be adjustable upon the sleeve 26 to allow for the variation or the throw of the armature 18 and the movement of the cylinder 32. The conductors, 12, 13 and 21, pass through suitable openings 44 in the sleeve 7 and then through the bracket 4 to the steering wheel 16'.

I claim as my invention:

1. A vehicle signal comprising a casing closed at one end, a plate snugly fitting the closed end, signal means carried by the plate, signal operating means also carried on the plate whereby upon removal of the plate the signal means and signal operating means will be removed as a unit, and a conductor sleeve secured to the plate and threaded through the closed end of the casing.

2. A vehicle signal comprising a casing having a closed end, a plate fitting the closed end, opposed electro-magnets arranged on the plate, an armature pivoted at one end to be selectively attracted by the magnets, a pair of upwardly inclined springs secured to the plate beneath the free end of the armature and crossing therebeneath and extending upon opposite sides thereof to hold the latter in its normally inoperative position, and a signal means operable by the armature.

3. A vehicle signal including a plate, opposed electro-magnets arranged thereon, an armature pivoted at one end for being selectively attracted by the magnets, a bearing supported by and spaced from the plate, a fixed sleeve on the bearing supporting a signal light on its outer end, a signal drum journaled on the sleeve, and means operable by the free end of the armature for imparting rotary movement to the signal drum.

4. A vehicle signal including a plate, opposed electro-magnets arranged thereon, an armature pivoted at one end for being selectively attracted by the magnets, a bearing supported by and spaced from the plate, a fixed sleeve on the bearing supporting a signal light on its outer end, a fulcrum arm fixed to the sleeve and superposed above the free end of the armature, a signal drum journaled on the sleeve, and means for transmitting the armature movement to the signal drum including a link pivoted on the fulcrum arm and connected at one end to the free end of the armature.

5. A vehicle signal including a plate, opposed electro-magnets arranged thereon, an armature pivoted at one end for being selectively attracted by the magnets, a bearing supported by and spaced from the plate, a fixed sleeve on the bearing, a signal light supported on its outer end, a fulcrum arm fixed to the sleeve and superposed above the free end of the armature, a pinion journaled on the sleeve, a signal drum inclosing the light and carried by the pinion, a lever engaged by the free end of the armature and having pivotal mounting on the fulcrum arm, and an arcuate rack meshing with the pinion and carried by the lever.

In witness wherof, I have hereunto set my hand this 25th day of July, 1917.

JOHN MAYER.